United States Patent [19]
Gonnocci

[11] Patent Number: 5,409,242
[45] Date of Patent: Apr. 25, 1995

[54] SWIVEL MOUNTINGS FOR A POWER CHUCK

[76] Inventor: Ralph J. Gonnocci, 1130 Cobridge Dr., Rochester Hills, Mich. 48306

[21] Appl. No.: 163,984

[22] Filed: Dec. 7, 1993

Related U.S. Application Data

[63] Continuation-in-part of Ser. No. 981,777, Nov. 25, 1992, Pat. No. 5,322,305, which is a continuation of Ser. No. 816,175, Jan. 2, 1992, Pat. No. 5,184,833.

[51] Int. Cl.[6] .......................................... B23B 31/175
[52] U.S. Cl. .................................. 279/106; 384/206; 384/296
[58] Field of Search ............... 384/154, 192, 203, 206, 384/209, 276, 295, 296, 428, 441; 279/106-109, 132

[56] References Cited

U.S. PATENT DOCUMENTS

| | | | |
|---|---|---|---|
| 2,613,943 | 10/1952 | Trudeau | 279/106 |
| 2,722,427 | 11/1955 | Labeyrie | 279/119 |
| 2,923,580 | 2/1960 | Dwyer | 384/209 |
| 3,069,181 | 12/1962 | Hohwart et al. | 279/106 |
| 3,131,948 | 5/1964 | Buck | 279/106 |
| 3,233,908 | 2/1966 | Schwarzmayer et al. | 279/107 |
| 3,267,580 | 8/1966 | Hohwart et al. | 33/178 |
| 3,365,206 | 1/1968 | Hohwart et al. | 279/106 |
| 3,423,098 | 1/1969 | Hohwart et al. | 279/109 |
| 3,472,526 | 10/1969 | Hohwart | 279/106 |
| 3,604,717 | 9/1971 | Hohwart | 279/106 |
| 3,945,652 | 3/1976 | Hohwart et al. | 279/5 |
| 4,215,605 | 8/1980 | Toth et al. | 279/106 |
| 4,465,289 | 8/1984 | Banks | 279/121 |
| 4,569,530 | 2/1986 | Cross | 279/123 |
| 4,667,971 | 5/1987 | Norton et al. | 279/121 |
| 4,679,802 | 7/1987 | Beal | 279/106 |
| 4,913,562 | 4/1990 | Rosen | 384/296 |
| 5,040,806 | 8/1991 | Hiestand | 279/110 |
| 5,184,833 | 2/1993 | Cross et al. | 279/106 |

FOREIGN PATENT DOCUMENTS 236623 7/1945 Switzerland ..................... 269/134

OTHER PUBLICATIONS

Publication: *Quick Change Jaws*, ITW Woodworth.

Primary Examiner—Steven C. Bishop
Attorney, Agent, or Firm—Bliss McGlynn

[57] ABSTRACT

A swivel mounting for mounting a rocker arm of a chuck and allowing pivoting movement of the rocker arm includes a cylindrical mounting member disposed in a cavity of the chuck and having an axial bore therethrough defining an interior surface thereof and a cylindrical bearing member disposed within the mounting member having an axial bore therethrough defining an interior surface thereof for supporting a portion of the rocker arm. The bearing member further has an exterior surface which is a mating surface with the interior surface of the mounting member. One of the mating surfaces has an annular channel therein, and the other of the mating surfaces has an annular projection thereon. The projection is positioned and sized to fit inside the channel, and the height of the projection is less than the height of the channel. Also disclosed is a chuck employing such swivel mountings.

20 Claims, 4 Drawing Sheets

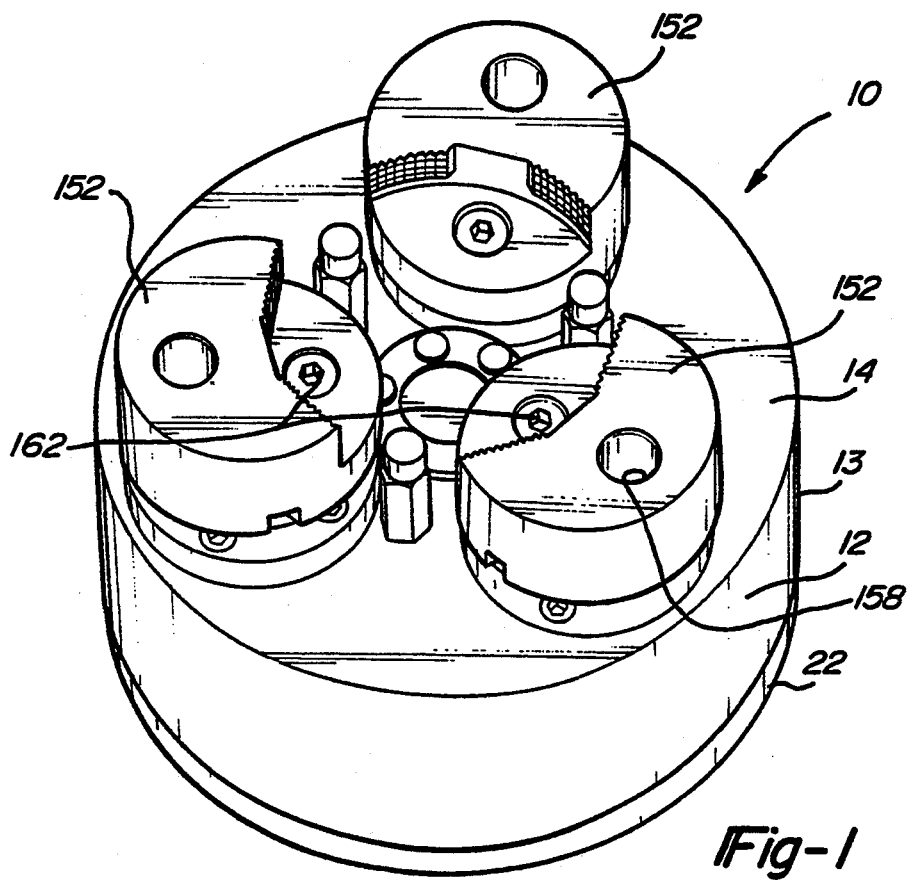
Fig-1
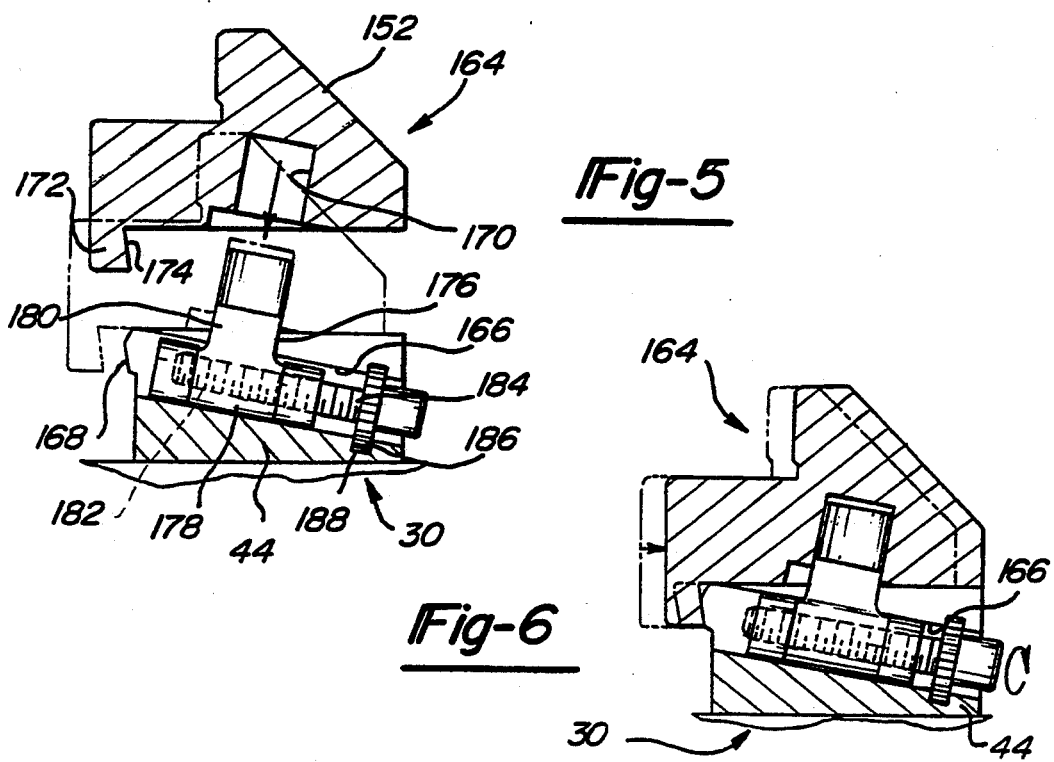
Fig-5
Fig-6

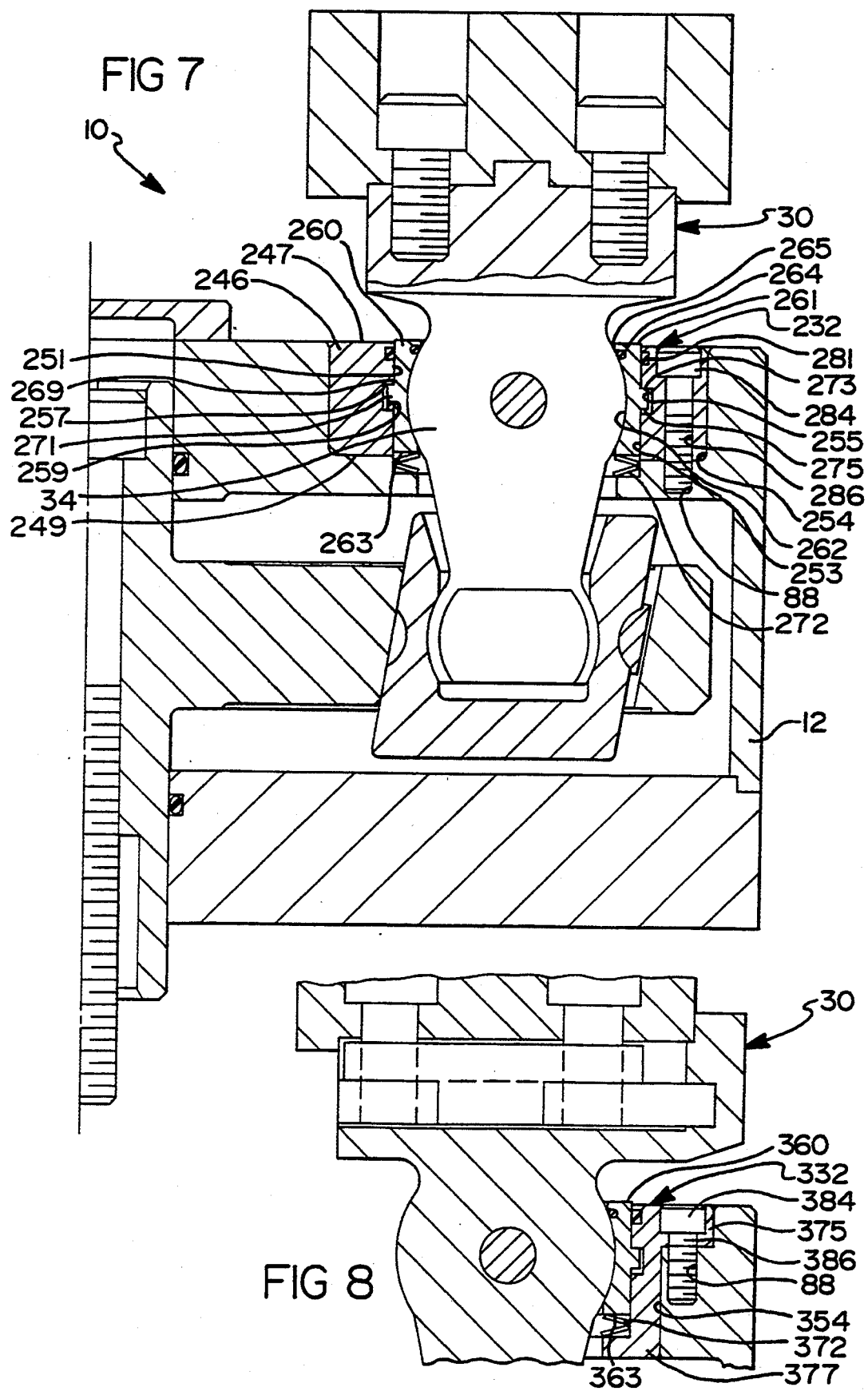

SWIVEL MOUNTINGS FOR A POWER CHUCK

CROSS-REFERENCE TO RELATED APPLICATION(S)

This is a continuation-in-part of application U.S. Ser. No. 07/981,777 filed on Nov. 25, 1992 now U.S. Pat. No. 5,322,305, which is a continuation of U.S. Ser. No. 816,175 filed Jan. 2, 1992 now U.S. Pat. No. 5,184,833.

BACKGROUND OF THE INVENTION

1. Field of the Invention

The present invention relates generally to power chucks, and, more particularly to, swivel mountings for a power chuck.

2. Description of the Related Art

Generally, power chucks are used to hold a workpiece. Typically, these power chucks are mounted on a rotatable spindle of a machine tool. Commonly, the power chuck has a body and an axially disposed actuator mounted for reciprocation therein. The power chuck also has a plurality of axially extending rocker arms with work engaging jaws spaced radially equidistantly around the actuator and mounted for rocking movement to engage and disengage the workpiece.

An improved power chuck was disclosed in U.S. Pat. No. 5,184,833 issued Feb. 9, 1993, to Kenneth Cross and Ralph J. Gonnocci. The disclosed power chuck includes a body, a plurality of work engaging jaws, a plurality of rocker arms carrying the jaws, and a plurality of swivel mountings connecting the rocker arms to the body. The swivel mountings include a tubular mounting member, a tubular bearing member disposed within the mounting member, and an annular ring member on top of the mounting member. The design of the swivel mountings, however, is subject to allowing debris to enter between the ring member and the bearing member and between the bearing member and the rocker arm during use which could lead to early wear of the various parts. An improved swivel mounting design is desired which is not subject to allowing debris to enter between its members or between its members and the rocker arm.

The design of the swivel mountings in U.S. Pat. No. 5,184,833 also requires a relatively high-profile construction, since the ring member is stacked on top of the mounting member. It is, therefore, desirable to have a swivel mounting which allows for a low-profile construction and does not have stacked members.

SUMMARY OF THE INVENTION

It is, therefore, one object of the present invention to provide a power chuck with swivel mountings which are not subject to allowing debris to enter between its parts or between itself and the rocker arm.

It is yet another object of the present invention to provide a power chuck with swivel mountings which result in a low-profile construction.

To achieve the foregoing objects, the present invention is a swivel mounting for mounting a rocker arm in a chuck and allowing pivoting movement of the rocker arm. The swivel mounting includes a cylindrical mounting member disposed within a cavity of the chuck and having an axial bore therethrough defining an interior surface thereof and a cylindrical bearing member disposed within the mounting member having an axial bore therethrough defining an interior surface thereof for supporting a rocker arm of the chuck. The bearing member also has an exterior surface, the exterior surface of the bearing member and the interior surface of the mounting member are mating surfaces. One of the mating surfaces has an annular channel therein, and the other of the mating surfaces has an annular projection thereon. The projection is positioned and sized to fit inside the channel, the height of the projection is less than the height of the channel.

One advantage of the present invention is that a swivel mounting is provided for a power chuck which minimizes the admittance of debris between its parts and between itself and the rocker arm, resulting in less wear on the swivel mounting and rocker arm. Another advantage of the present invention is that a swivel mounting is provided for a power chuck which requires a shorter construction than previous swivel mountings to minimize materials of construction and for easier maneuvering of the rocker arms for the chuck. Yet another advantage is that a power chuck is provided which employs the swivel mountings having the above-described advantages and results in a low-profile construction.

Other objects, features and advantages of the present invention will be readily appreciated as the same becomes better understood after reading the subsequent description taken in light of the accompanying drawings.

BRIEF DESCRIPTION OF THE DRAWINGS

FIG. 1 is a perspective view of a power chuck according to the present invention.

FIG. 5 is an exploded fragmentary elevational view of a quick-change jaw assembly for the power chuck of FIGS. 1 through 4.

FIG. 6 is a view similar to FIG. 5 illustrating the quick-change jaw assembly in an assembled position.

FIG. 7 is a sectional view of a first alternate embodiment, according to the present invention, of a swivel mounting having an alternative design from those shown in FIGS. 1–4.

FIG. 8 is a partial view similar to FIG. 7 illustrating a second alternate embodiment, according to the present invention, of the swivel mounting of FIGS. 1 through 4.

DESCRIPTION OF THE PREFERRED EMBODIMENT(S)

Figure 2:
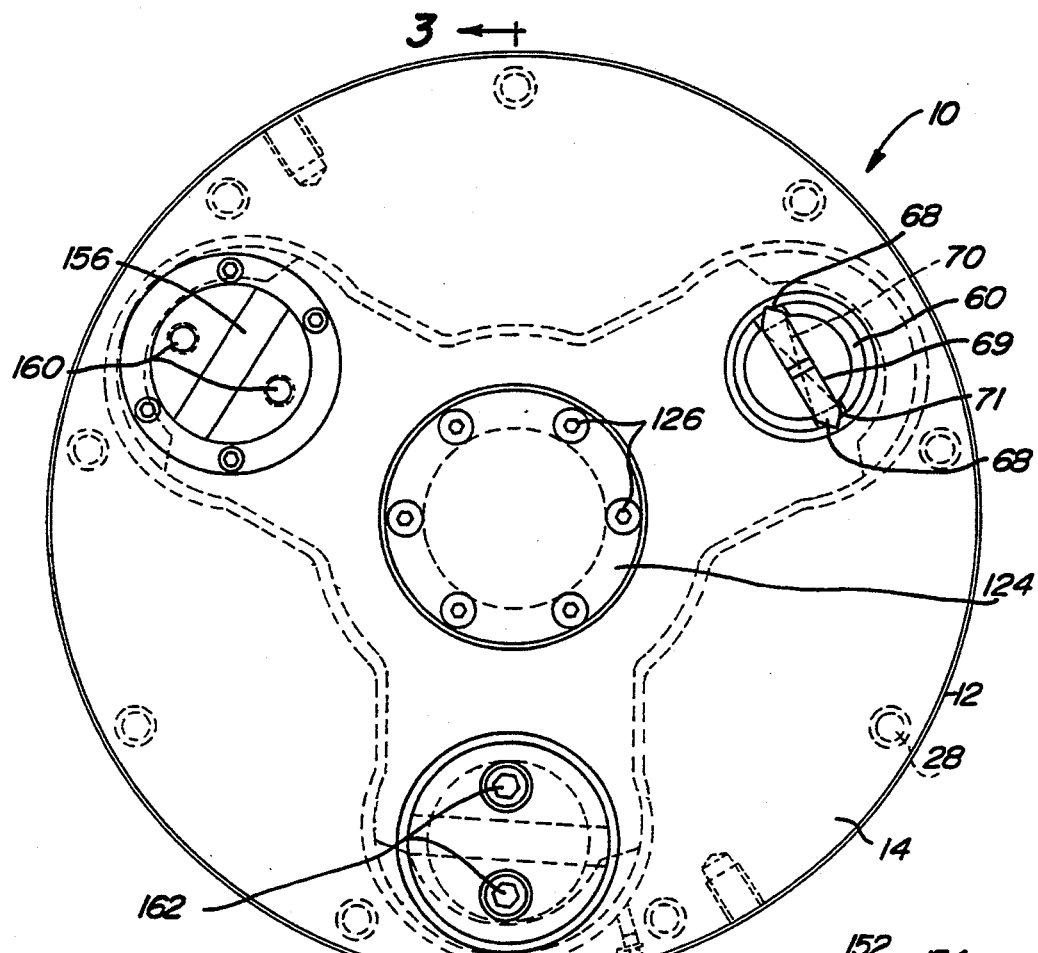
FIG. 2 is a plan view of the power chuck of FIG. 1 illustrating two jaws removed.
Figure 3:
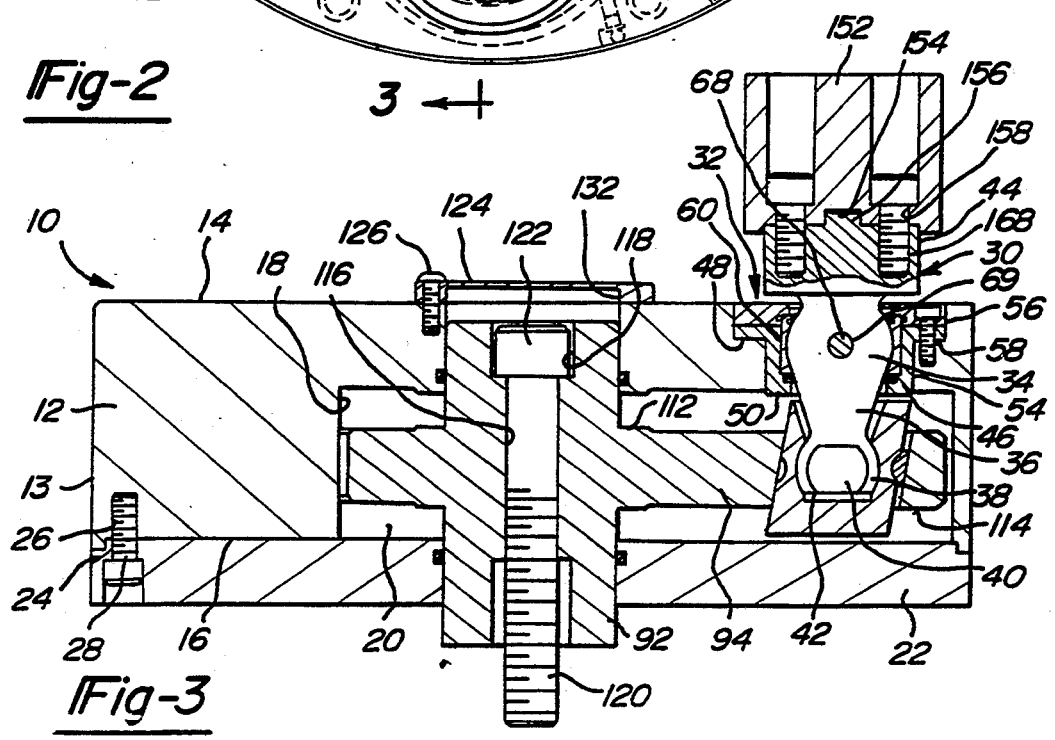
FIG. 3 is a sectional view taken along line 3—3 of FIG. 2.

Referring to FIGS. 1 through 4, a power chuck 10 according to the present invention is shown. The power chuck 10 includes a body 12 which is generally cylindrical in shape. The body 12 is made, preferably, of a metal material. The body 12 has a circular peripheral surface 13, radial front face 14, radial rear face 16 and a cavity 18 in the interior of the body 12 which is cored out or recessed to accommodate other parts of the power chuck 10. The cavity 18 has an opening 20 through the rear face 16.

The power chuck 10 also includes an adapter plate 22 which is partially recessed into the body 12 and closes the opening 20. The adapter plate 22 is generally cylindrical in shape and has a plurality of apertures 24 extending axially therethrough and adapted to match corresponding internally threaded apertures 26 in the body 12. Fasteners 28 such as screws extend through the apertures 24 and threadably engage the threaded apertures 26 to hold the adapter plate 22 fixedly but detachably fastened to the body 12. The heads of the screws 28 are countersunk into the adapter plate 22. It should be appreciated that the adapter plate 22 may be adapted for mounting on the front of a machine spindle (not shown). It should also be appreciated that the adapter plate 22 may be of any suitable shape or design to fit any particular machine or spindle and may vary from one machine to another.

The power chuck 10 includes a plurality of rocker arms, generally indicated at 30. In the preferred embodiment, three (3) rocker arms 30 are spaced equidistantly with respect to each other and from a central axis of the power chuck 10. The rocker arms 30 extend axially through the front face 14 of the body 12 and into the cavity 18. Each rocker arm 30 is attached to the body 12 by a swivel mounting, generally indicated at 32, to be described.

The rocker arm 30 has a ball portion 34 which is generally spherically shaped and a tapered portion 36 which tapers longitudinally to an end portion 38. The end portion 38 is generally spherically shaped with a pair of opposed flat or planar outer surfaces 40 and a flat or planar bottom surface 42. The rocker arm 30 also has a mounting portion 44 to be described extending longitudinally from the ball portion 34 forwardly of the front face 14 of the body 12.

The swivel mounting 32 includes a tubular mounting member 46 having a radial front flange 48 and a radial rear flange 50. The rear flange 50 terminates to form an opening 51 through which the rocker arm 30 extends and has a recessed portion 52. The mounting member 46 is disposed in a cavity 54 of the body 12. The cavity 54 has an enlarged opening 56 in the front face 14. The front flange 48 is adapted to abut a shoulder 58 forming the enlarged opening 56. It should be appreciated that the rocker arm 30 extends through the enlarged opening 56 and cavity 54.

The swivel mounting 32 also includes a tubular bearing member 60 disposed within the mounting member 46. The bearing member 60 has an arcuate interior surface 62 to matingly engage or contact the outer surface of the ball portion 34. The bearing member 60 has a seal 64 such as an O-ring disposed in a groove 66 near the front thereof. The seal 64 contacts directly the outer surface of the ball portion 34. The bearing member 60 is, preferably, a single fracture split member disposed about the ball portion 34 of the rocker arm 30. It should be appreciated that the outer surface of the ball portion 34 pivots on the interior surface 62 of the bearing member 60.

The swivel mounting 32 further includes a pair of pin members 68 extending through an aperture 69 in the ball portion 34. The swivel mounting 32 includes a homing spring 70 disposed within pockets of the pin members 68 to urge the pin members 68 in corresponding apertures 71 (FIG. 2) in the bearing member 60. The homing spring 70 allows the pin members 68 to move toward each other as the rocker arm 30 is rotated such that the pin members 68 disengage the apertures 71. The homing spring 70 also allows the pin members 68 to move away from each other to engage the apertures 71 when aligned therewith. It should be appreciated that the rocker arm 30 and pin members 68 rotate together.

The swivel mounting 32 includes at least one spring 72 disposed in the recessed portion 52 between the bearing member 60 and the rear flange 50. The spring 72 is preferably a pulldown or wave spring although any suitable spring may be used. The spring 72 provides resiliency to control pull back of the rocker arms 30 during chucking and to push forward the rocker arms 30 during unchucking. It should be appreciated that during chucking the rocker arms 30 pull down or move back toward the adapter plate 22 a predetermined distance such as 0.030 inches.

The swivel mounting 32 also includes an annular ring member 74 disposed in the enlarged opening 56 and having an aperture 76 extending therethrough. The ring member 74 has a shoulder 78 to engage the bearing member 60 and prevent the bearing member 60 from exiting the mounting member 46. The ring member 74 has a seal 80 such as an O-ring disposed in a groove 82 between the ring member 74 and bearing member 60. Fasteners 84 such as screws extend through apertures 85 and 86 in the ring member 74 and mounting member 46, respectively, to threadably engage corresponding internally threaded apertures 88 to hold the ring member 74 fixedly but detachably fastened to the body 12.

Referring to FIG. 7, a first alternate embodiment 232, according to the present invention, of the swivel mountings 32 is shown. Like parts of the swivel mountings 32 have like reference numerals increased by two hundred (200). In FIG. 7, the swivel mounting 232 is disposed in the cavity 254 of the body 12 (shown in part) of the power chuck 10. The swivel mounting 232 includes a cylindrical mounting member 246 and a cylindrical bearing member 260 disposed within the mounting member 246. The bearing member 260 has a front end 261, a rear end 263, and an axial bore 265 extending from the front end 261 to the rear end 263. The axial bore 265 defines an arcuate interior surface 262 to matingly engage or contact the outer surface of the ball portion 34 of the rocker arm 30. The bearing member 260 has a seal 264 on the interior surface 262 near the front end 261. The seal 264 is a sealing member, such as an O-ring, disposed in an annular recess in the interior surface 262. The seal 264 contacts directly the outer surface of the ball portion 34. The bearing member 260 is preferably a single fracture split member disposed about the ball portion 34 of the rocker arm 30. It should be appreciated that the outer surface of the ball portion 34 pivots on the interior surface 262 of the bearing member 260.

The bearing member 260 also has an exterior surface 269 which contacts the mounting member 246. The periphery of the exterior surface 269 is generally circular with an annular projection 271 extending radially outwardly therefrom near the middle of the mounting member 246. The annular projection 271 is rectangular in cross section and has an upper surface 273 and a lower surface 275.

The mounting member 246 has its rear end 263 rests on at least one spring 272 which is disposed in a recessed portion of the cavity 254 of the power chuck 10. The spring 272 performs the same function as the spring 72 shown in FIGS. 3 and 4.

The mounting member 246 has a front end 247, a rear end 249, and an axial bore 251 extending from the front end 247 to the rear end 249. The axial bore 251 defines an interior surface 253 which mates with the exterior surface 269 of the bearing member 260. The periphery of the interior surface 253 of the mounting member 246 is generally circular with an annular channel 255 extending radially inwardly therefrom near midway between the front end 247 and the rear end 249. The annular channel 255 is rectangular in cross section and has an upper surface 257 and a lower surface 259. The annular projection 271 on the bearing member 260 is positioned and disposed within the annular channel 255 of the mounting member 246. The width and the height of the annular projection 271 is less than the width and the height of the annular channel 255. The annular projection 271 is capable of up and down or axial movement within the annular channel 255, but the distance of the movement is limited by the upper and lower surfaces 257 and 259 of the annular channel 255. The annular projection/annular channel combination also provides a locking mechanism to keep the bearing member 260 from lifting out or disengaging the mounting member 246 during use of the power chuck 10.

The mounting member 246 has a seal 281 on the interior surface 253 near the front end 247 above the annular channel 255. The seal 281 is a sealing member, such as an O-ring, disposed in an annular recess in the interior surface 253. The seal 281 contacts directly the exterior surface 269 of the bearing member 260.

Fasteners 284, such as screws, extend through an aperture 286 in the mounting member 246 and into an aperture 88 in the body 12 of the power chuck 10 to hold the mounting member 246 fixedly but detachably to the body 12.

In operation, when the swivel mounting 232 is in an unpivoted or unchucked position, the upper surface 273 of the annular projection 271 abuts the upper surface 257 of the annular channel 255. The front end 261 of the bearing member 260 is substantially flush with the front end 247 of the mounting member 246 and front end 14 of the body 12 of the power chuck 10. Except for the gap remaining between the annular channel 255 and the annular projection 271, the exterior surface 269 of the bearing member 260 and the interior surface 253 of the mounting member 246 matingly contact and are flush with each other. The seals 264 and 281 prevent debris from entering the swivel mounting 232. During chucking, the rocker arm 30 may be pulled back against the spring 272. When this occurs, the lower surface 275 of the annular projection 271 abuts the lower surface 259 of the annular channel 255. The seals 264 and 281 maintain contact and prevent debris from entering the swivel mounting 232.

Referring to FIG. 8, a second alternate embodiment 332, according to the present invention, of the swivel mountings 32 is shown. Like parts of the swivel mountings 32 have like reference numerals increased by three hundred (300). The swivel mounting 332 is disposed in the cavity 354 of the body 12 (shown in part) of the power chuck 10. The swivel mounting 332 is similar to the swivel mounting 232 of FIG. 7 except for the mounting member 246. Otherwise, the parts of the swivel mounting 332 are the same as the parts of the swivel mounting 232.

The mounting member 346 has a front flange 375 extending radially outwardly and a rear flange 377 extending radially inwardly. The front flange 375 has an aperture 386 extending axially therethrough and a fastener 384 extending through the aperture 386 and into the aperture 88 of the body 12 of the power chuck 10 to fixedly but detachably fasten the mounting member 246 to the body 12. The spring 372 is disposed between the rear end 363 of the bearing member 360 and a top surface of the rear flange 377 of the mounting member 346. The operation of the swivel mounting 332 is similar to that of swivel mounting 232.

The power chuck 10 includes an actuator, generally indicated at 90, to pivot or rock the rocker arm 30. The actuator 90 has a journal 92 and a plurality of arm or lobe portions 94 extending radially from the journal 92. Preferably, three lobe portions 94 are equally circumferentially spaced about the journal 92 and have an aperture 96 extending through near the radial free end thereof. The aperture 96 is inclined radially outwardly. Preferably, the angle of incline is ten degrees (10°). It should be appreciated that one of the lobe portions 94 engages or contacts a corresponding portion of the cavity 18 to prevent rotation of the actuator 90 in the cavity 18.

The journal 92 is disposed and slidably received in apertures 100 and 102 provided centrally in the front face 14 of the body 12 and in the adapter plate 22, respectively. A seal 104 such as an O-ring is disposed in a groove 106 about the opening 108 and a seal 108 such as an O-ring is disposed in a groove 110 about the opening 102 in the adapter plate 22 to directly contact the journal 92. The actuator 90 is guided for reciprocatory travel in both directions by the apertures 100 and 102 and is limited by front and rear abutments 112 and 114 on the lobe portions 94. It will be appreciated that the front abutment 112 seats against the bottom of the aperture 100 when the actuator 90 is at the forward limit of its travel illustrated in phantom lines and that the rear abutment 114 seats against the adapter plate 22 when the actuator 90 is at the rearward limit of its travel illustrated by solid lines in FIG. 4. It should be appreciated that the rear abutment 114 may not seat against the adapter plate 22 when a workpiece is disposed in the power chuck 10.

The actuator 90 includes an aperture 116 extending axially through the journal 92 and having a countersink 118 at the forward end thereof to accept a machine screw 120 having a head 122 disposed in the countersink 122. It should be appreciated that the machine screw 120 connects the actuator 90 to a drawbar (not shown) disposed within the spindle. It should also be appreciated that suitable breather vents (not shown) are provided to prevent build up of pressure forward of the journal 92.

The power chuck 10 further includes a cap 124 mounted centrally about the opening 100 in the front face 14 of the body 12. The cap 124 is fixedly but detachably fastened to the body 12 by fasteners 126 such as screws. The fasteners 126 extend through apertures 128 in the cap 124 and threadably engage corresponding internally threaded apertures 130 in the body 12 such that the cap 124 covers the aperture 100 and protects the journal 92. The cap 124 may be formed with an internal pocket or recess 132 which coincides with the aperture 100 and progressively receives the journal 92 as the actuator 90 moves forwardly to the forward limit of its travel. It should be appreciated that the journal 92 extends entirely through the adapter plate 22 and into the spindle for convenient attachment to the drawbar. It should also be appreciated that although the actuator 90 is intended for attachment to a mechanical drive such as the drawbar of a machine tool, it can easily be adapted for hydraulic or pneumatic operation.

The power chuck 10 also includes a power cylinder or slide member 134 connected to each of the rocker arms 30. The slide member 134 is generally cylindrical in shape. The slide member 134 is inclined and adapted to mate with the incline of the aperture 96. The slide member 134 has a cavity 136 with an enlarged tapered opening 138 at a front end thereof. The cavity 136 has an arcuate interior surface 140 having a planar or flat side surfaces (not shown). The end portion 38 is inserted into the cavity 136 of the slide member 134 and rotated such that the arcuate outer surface of the end portion 38 matingly engages or contacts the interior surface 140 of the cavity 136. The slide member 134 also has a groove or key way 144 circumferentially about the outer periphery thereof which is generally arcuate in shape. A key 146 has an arcuate portion 148 disposed in the key way 144 and extending partially circumferentially therealong. The key 146 also has a planar portion 150 which abuts the surface of the opening 96. The key 146 prevents the slide member 134 from rotating and disengaging the end portion 38 of the rocker arm 30. It should be appreciated that the end portion 38 rotates along the interior surface 140 of the slide member 134.

The power chuck 10 further includes a work engaging jaw 152 for each rocker arm 30. The jaw 152 may be cylindrical or rectangular in shape. The jaw 152 is mounted on the mounting portion 44 of the rocker arm 30. The jaw 152 may include a key way 154 on a bottom or rear surface thereof adapted to receive a corresponding key 156 extending axially from a front or top surface of the mounting portion 44. In the preferred embodiment, the key way 154 and key 156 are generally rectangular in shape. The jaw 152 has at least one, preferably a plurality of apertures 158 extending axially therethrough and adapted to match corresponding threaded apertures 160 in the mounting portion 44. Fasteners 162 such as screws extend through the apertures 158 and threadably engage the threaded apertures 160 to hold the jaw 152 fixedly but detachably fastened to the rocker arm 30. The heads of the screws are countersunk in the jaw 152 so not to interfere with the workpiece. As illustrated in FIG. 1, the jaws 152 may have a portion removed, the shape of which may be varied depending on the shape of the workpiece.

Figure 4:
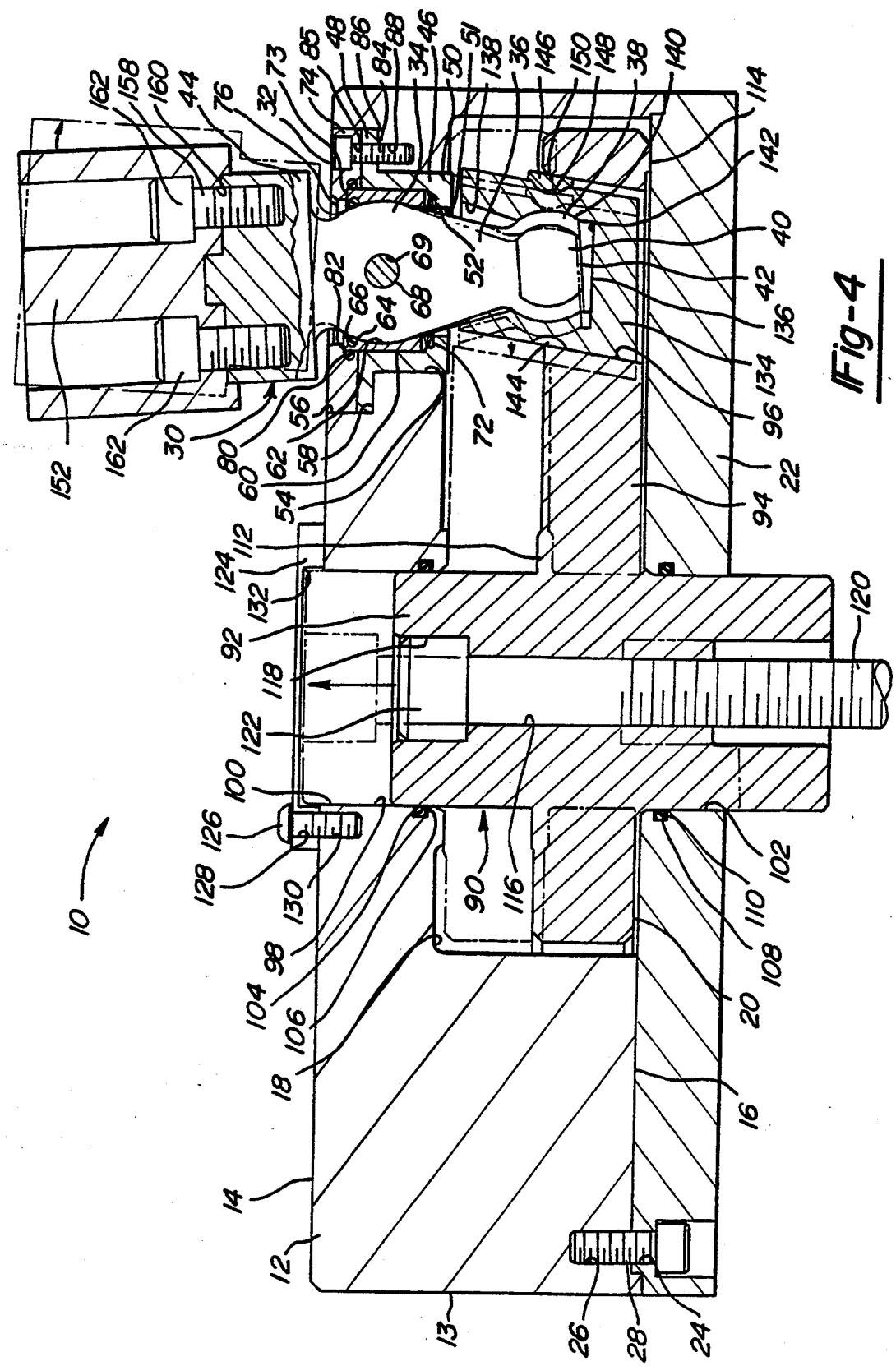
FIG. 4 is an enlarged view of FIG. 3 illustrating the power chuck in an open and closed jaw position.

In operation, the power chuck 10 has a first and second operable position as illustrated in FIG. 4. In phantom lines, the actuator 90 is in an open or unlocked position and the front abutment 112 on the lobe portions 94 contact the bottom of the aperture 100. The workpiece is loaded on the front face 14 of the power chuck 10. The actuator 90 is moved by the drawbar axially toward the adapter plate 22. As this occurs, the inclined surfaces of the aperture 96 travel along the slide member 134 and key 146 to move the slide member 134 radially outwardly. The radial outward movement of the slide member 134 pivots or rotates the end portion 38, in turn, pivoting the rocker arm 30 radially inwardly such that the jaw 152 engages the workpiece. In solid lines, the actuator 90 is in a closed or locked position and the rear abutment 114 on the lobe portions 94 contact the adapter plate 22. The operation is reversed to disengage the workpiece.

Referring to FIGS. 5 and 6, a quick-change jaw assembly 164 according to the present invention is shown. The assembly 164 includes an aperture 166 extending on an incline through the mounting portion 44 of the rocker arm 30. The mounting portion 44 may also have an inclined surface 168 at one radial end. The jaw 152 has a pocket 170 extending on an incline substantially perpendicular to the incline of aperture 166. The jaw 152 has an axially extending lip 172 with an inclined surface 174 adapted to mate with the inclined surface 168 of the mounting portion 44. The assembly 164 includes a connector 176 having a first portion 178 and a second portion 180 substantially perpendicular to the first portion 178 to form a general "T" shape. The first portion 178 includes a threaded aperture 182 extending therethrough. The assembly 164 includes a fastener 184 having a radial flange 186. The fastener 184 threadably engages the threaded aperture 182 and the flange 186 engages a groove 188 in the mounting portion 44 to prevent the fastener 184 from exiting the aperture 166.

In operation, the first portion 178 of the connector 176 is disposed in the aperture 166 and the second portion 180 extends outwardly of the mounting portion 44. The fastener 184 engages the threaded aperture 182 and the flange 186 is disposed in the groove 188. The jaw 152 is moved toward the mounting portion 44 such that the second portion 180 is received in the pocket 170. As the fastener 184 is rotated, the jaw 152 moves radially such that the inclined surface 174 engages and disengages the inclined surface 168 in a locked and unlocked position shown in solid and phantom lines in FIG. 6, respectively.

Accordingly, the power chuck 10 is provided in various sizes, six inch, eight inch, etc. The power chuck 10 may provide external and internal chucking with centralizing, compensating or off-on. The power chuck 10 provides first and second chucking, ball joint construction, high power ratio, positive gripping force, increased jaw travel, sealed design, pullback action, built-in jaw swivel, and standard or quick-change jaws.

The swivel mountings 232 and 332 for mounting the rocker arms 30 of the power chuck 10 are capable of pivoting movement and prevent debris from entering into their parts or between their parts and the rocker arm 30 for increased life. The swivel mountings 232 and 332 also offer a low-profile construction to the power chuck 10 and minimize materials of construction of the body 12 and for easier maneuvering of the power chuck 10.

The present invention has been described in an illustrative manner. It is to be understood that the terminology which has been used is intended to be in the nature of words or description rather than of limitation.

Many modifications and variations of the present invention are possible in light of the above teachings. Therefore, within the scope of the appended claims, the present invention may be practiced otherwise than as specifically described.

I claim:

1. A swivel mounting for mounting a rocker arm in a chuck, the swivel mounting having a front end and allowing pivoting movement of the rocker arm, comprising:
    a cylindrical mounting member disposed within a cavity of a chuck and having an axial bore therethrough defining an interior surface thereof; and
    a cylindrical bearing member disposed within said mounting member and having an axial bore therethrough defining an interior surface thereof for supporting a rocker arm of the chuck, said bearing member further having an exterior surface, said exterior surface of said bearing member and said interior surface of said mounting member being mating surfaces, one of the mating surfaces having an annular channel therein and the other of the mating surfaces having an annular projection thereon, said projection positioned and sized to fit inside said channel, the height of said projection being less than the height of said channel.

2. A swivel mounting as set forth in claim 1 wherein said channel is in said interior surface of said mounting member and said projection is on said exterior surface of said bearing member.

3. A swivel mounting as set forth in claim 1 wherein the width of said projection is less than the width of said channel.

4. A swivel mounting as set forth in claim 1 including a spring to urge an upper surface of said projection to abut an upper surface of said channel.

5. A swivel mounting as set forth in claim 1 wherein said channel and projection are positioned near a middle of said bearing member.

6. A swivel mounting as set forth in claim 1 wherein said mounting member has a seal on an interior surface thereof nearer a front end of the swivel mounting than said projection and said annular channel.

7. A swivel mounting as set forth in claim 1 wherein said mounting member has an annular recess in said interior surface nearer the front end of said swivel mounting than said annular projection and said annular channel and a sealing member disposed within the annular recess.

8. A swivel mounting as set forth in claim 1 wherein said bearing member has a seal on the interior surface thereof near the front end of said swivel mounting.

9. A swivel mounting as set forth in claim 1 wherein said bearing member has an annular recess in the interior surface thereof near the front end of said swivel mounting and a sealing member disposed within said annular recess.

10. A swivel mounting for mounting a rocker arm in a chuck, the swivel mounting having a front end and allowing pivoting movement of the rocker arm, comprising:
   a cylindrical mounting member disposed within a cavity of a chuck and having an axial bore therethrough defining an interior surface thereof having an annular channel therein having an upper surface; and
   a cylindrical bearing member disposed within said mounting member and having an axial bore therethrough defining an interior surface thereof for supporting a portion of the rocker arm, said bearing member further having an exterior surface having an annular projection having an upper surface, said projection positioned and sized to fit inside said channel, the height and the width of said projection being less than the height and the width of said channel, respectively, said exterior surface of said bearing member and the interior surface of said mounting member being mating surfaces, the cylindrical mounting member having a seal between the mating surfaces nearer the front end of the swivel mounting than the annular channel, said bearing member having a seal on the interior surface thereof near the front end of the swivel mounting.

11. A chuck, comprising:
   a body;
   a plurality of work engaging jaws;
   a plurality of rocker arms carrying said work engaging jaws, said rocker arms extending axially along an axis, said rocker arms having a mounting portion at one axial end for said work engaging jaws and an end portion at the other axial end; and
   a plurality of swivel mountings connecting said rocker arms to said body, said swivel mountings having a front end and allowing pivoting movement of said rocker arms, said swivel mountings each comprising:
      a cylindrical mounting member disposed within a cavity of said body and having an axial bore therethrough defining an interior surface thereof; and
      a cylindrical bearing member disposed within said mounting member and having an axial bore therethrough defining an interior surface thereof for supporting one of the rocker arms, said bearing member further having an exterior surface, said exterior surface of said bearing member and said interior surface of said mounting member being mating surfaces, one of the mating surfaces having an annular channel therein and the other of the mating surfaces having an annular projection thereon, said projection positioned and sized to fit inside said channel, the height of said projection being less than the height of said channel.

12. A chuck as set forth in claim 11 wherein said channel is in said interior surface of said mounting member and said projection is on said exterior surface of said bearing member.

13. A chuck as set forth in claim 11 wherein the width of said projection is less than the width of said channel.

14. A chuck as set forth in claim 11 including a spring to urge an upper surface of said projection to abut an upper surface of said channel.

15. A chuck as set forth in claim 11 wherein said channel and annular projection are positioned near a middle of said bearing member.

16. A chuck as set forth in claim 11 wherein said mounting member has a seal between the mating surfaces nearer the front end of said swivel mounting than said projection and said channel.

17. A chuck as set forth in claim 11 wherein said mounting member has an annular recess in said interior surface nearer the front end of said swivel mounting than said projection and said channel and a sealing member disposed within said annular recess.

18. A chuck as set forth in claim 11 wherein said bearing member has a seal on said interior surface thereof near the front end of said swivel mounting.

19. A chuck as set forth in claim 11 wherein said bearing member has an annular recess in said interior surface thereof near the front end of said swivel mounting and a sealing member disposed within said annular recess.

20. A chuck, comprising:
   a body;
   a plurality of work engaging jaws;
   a plurality of rocker arms carrying said work engaging jaws, said rocker arms extending axially along an axis, said rocker arms having a mounting portion at one axial end for said work engaging jaws and an end portion at the other axial end; and
   a plurality of swivel mountings connecting said rocker arms to said body, said swivel mountings having a front end and allowing pivoting movement of said rocker arms, said swivel mountings each comprising:
      a cylindrical mounting member disposed in a cavity of said body and having an axial bore therethrough defining an interior surface thereof having an annular channel therein having an upper surface; and a cylindrical bearing member disposed within said mounting member having an axial bore therethrough defining an interior surface thereof for supporting a portion of said rocker arm, said bearing member further having an exterior surface having an annular projection having an upper surface, said projection positioned and sized to fit inside said channel, the height and the width of said projection being less than the height and the width of said channel, respectively, said exterior surface of said bearing member and said interior surface of said mounting member being mating surfaces, said mounting member having a seal between the mating surfaces nearer the front end of said swivel mounting than the annular channel, said bearing member having a seal on the interior surface thereof near the front end of said swivel mounting.

* * * * *